Patented Apr. 13, 1948

2,439,441

UNITED STATES PATENT OFFICE 2,439,441

DISINFECTANT HYDRAULIC CEMENT AND METHOD OF MAKING THE SAME

Charles Rhodimer Amberg and William John Knapp, Alfred, N. Y., assignors to North American Cement Corporation, Catskill, N. Y., a corporation of Delaware No Drawing. Application February 8, 1943, Serial No. 475,166

2 Claims. (Cl. 106—15)

This invention relates to a disinfectant hydraulic cement.

It is customary to keep the walls and floors of hospitals, dairies, chicken-houses, slaughter houses, gymnasiums, swimming pools, public rest rooms, and the like in an antiseptic or aseptic condition by frequent washings with a disinfectant solution. When these walls and floors are made of concrete, stucco, plaster and like structural materials, their surfaces generally are treated to make them impervious to liquids in order to limit bacteria and fungi to the surface. If the surfaces are rendered truly impervious to liquids, the walls and floors may be kept in an aseptic condition by treatment with appropriate disinfectant preparations, as, for instance, by frequent washings with disinfectant solutions. But the rendering of the surfaces of such structural materials impervious to liquids is difficult and involves considerable expense. Thus, the maintaining of such surfaces under truly aseptic conditions frequently is prohibitively costly.

It is an object of this invention to provide a hydraulic disinfectant cement for producing structural materials, such as concrete, which makes it possible to maintain aseptic conditions in hospitals, dairies, barns, and the like containing concrete walls or floors without the added expense and uncertainty incident to rendering such concrete surfaces impervious to water and without the contingent expense of frequent washings with disinfectant solutions. It is another object of the invention to provide a disinfectant hydraulic cement forming strong structural materials having continuing disinfecting properties as well as high compressive and tensile strength. Such disinfectant structural materials incorporating disinfectants which do not materially adversely affect the set and strength of such materials are referred to hereinafter as strong structural materials.

We have found that disinfectant hydraulic cements forming strong structural materials having self-disinfecting properties may be produced by incorporating in the cement various disinfectants of low water-solubility and high bacterial toxicity. These disinfectants may be organic or inorganic and include such compounds as polyhalogenated phenols, especially pentachlorophenol; thiuram disulfide; quaternary ammonium compounds substituted on the quaternary nitrogen atom by higher molecular aliphatic radicals, such as cetyl morpholinium alkyl halides; oxides and chlorides of mercury; sulfur and similar disinfectants of low water-solubility and high toxicity to bacteria. We have found further that hydraulic cements containing an admixture of organic and inorganic disinfectants are, at times, substantially more potent in their disinfecting properties than such cements containing either type of disinfectant alone. For example, a hydraulic cement containing 1% of pentachlorophenol and 1% of cupric oxide or 1% of copper has been found to be much more potent in its disinfecting power than a cement containing 2% of either of said disinfectants.

Generally speaking, the disinfectant agents may be advantageously mixed with the cement in an effective dosage during the grinding of the clinker or immediately thereafter. The resulting disinfectant cement is stable in storage and may be marketed in the same manner as untreated hydraulic cements for the purpose of making a disinfectant concrete. The introduction of the disinfectant agent into the cement prior to making the mix producing concrete, stucco, plaster and like structural materials, has considerable advantage due to the fact that builders and masons may construct buildings with walls and floors having disinfecting properties by following their usual practices without having or procuring a knowledge of the problems of the disinfectant arts. Nevertheless, the disinfecting agents of the present invention may be incorporated in the structural materials during the mixing operation or the finished structural materials may be impregnated with the disinfectant.

Under certain circumstances, an additional advantage is obtained by mixing the disinfectant agent during the grinding of the clinker. For instance, when the disinfectant agent consists of pentachlorophenol and cupric oxide or copper, it is advantageous to introduce the disinfectant during the grinding of the cement where it serves also as a grinding aid and, subsequently, when mortars or concrete mixes are made with the cement obtained, increases the plasticity of said mixes.

The disinfectant agents may be utilized in the cements in proportions which are adequate to impart a relatively permanent and continuous disinfectant action. In some instances, as little as 0.1% imparts a discernible disinfectant action. Normally, from 1% to 2% of the disinfectant agent is adequate. As much as 4% of pentachlorophenol has been incorporated in Portland cement without materially adversely affecting the concrete made therefrom. Somewhat greater quantities of the disinfectant may be used in hydraulic cements for making structural materials, but the properties of strength, initial and final sets of the structural materials begin to be adversely affected.

Structural materials made from the disinfectant cement of this invention have substantially the normal strength of such structural materials which do not include the disinfectant, and, in addition, have a disinfectant action which continues over such a long period of time that it may be considered to have a permanent disinfectant action.

For example, a self-disinfecting mortar block ¾" x ¾" x ⅛" made from a mortar mixture containing a cement-to-sand ratio of one to three and having 4 parts of pentachlorophenol per 1000 parts of cement was stored in a damp closet for twenty-four hours and then immersed for two weeks in running fresh water. Thereafter, the cement block was air-dried for twenty-four hours, water saturated, and subsequently sterilized. The block was then placed in a sterilized culture dish, such as a Petri dish, and a sterilized nutrient-agar was inoculated with *Staphylococcus aureus* and introduced into the dish so as to surround but not cover the concrete block, whereupon the entire mass was subjected to incubation for twenty-four hours. After the period of incubation, bacterial growth was readily discernible in the nutrient-agar but a definite aseptic zone free of growing bacteria was observed around the concrete block. A number of tests showed that the aseptic zone averaged about 5 mm.

In a similar series of tests, a disinfecting hydraulic concrete incorporating two parts of mercurous chloride per hundred parts of cement showed an aseptic zone of 3.5 mm., while the same percentage composition of sulfur and thiuram disulfide showed aseptic zones of 5 mm. and 4.5 mm., respectively. A disinfectant cement containing 4% of mercuric oxide when made into concrete showed an aseptic zone of 8 mm.

In another test of the effectiveness of the disinfectant properties of concrete made from our disinfectant cement, a hole 2" deep by 6" was chipped in the concrete shower room floor of a university field house and filled with a concrete made with three parts of sand to one part of a 0.4% pentachlorophenol Portland cement. After the concrete had set, the shower room was used by students over a period of time. A definite area of the disinfectant concrete was swabbed with a sterile swab and bacteria count taken in accordance with standard procedure. Then a similar and identical area of the untreated floor was swabbed in the same manner and the corresponding tests made. Several tests showed that the disinfectant concrete patch gave a maximum bacteria and fungi count of 600 per square inch, while the regular concrete gave an average count of 35,000 per square inch. Thus, the disinfectant patch showed a significant reduction in the bacterial numbers.

In another use of our invention, a concrete floor, varying in thickness from 2" to 4½" was laid in a pasteurizing room of a dairy. The floor was 16' by 16' in size and was divided equally between regular concrete and a disinfectant concrete. One-half of the floor was made with a concrete having one part of 0.4% pentachlorophenol cement, one part of sand and two parts of pea-gravel, all by weight, while the other half of the floor was constructed with the same concrete mix with the exception of the pentachlorophenol. After using the floor for more than a week, similar sections of the treated and untreated flooring of identical area were tested in the same manner as that used in testing the gymnasium floor. A series of four tests per day for ten different days, over a period of approximately three weeks, showed a ratio of bacteria numbers on disinfectant concrete to those on untreated concrete of 1 to 5.4. Thus, the bacteria and fungi growths were markedly inhibited by the disinfectant cement, as compared to the untreated cement.

In another test, a platform 4" high was laid in front of the pasteurizer in such a position that the men working on the pasteurizer would stand on it, and a certain amount of milk spillage would occur on it. This platform consisted of a checkerboard of 9" tile, consisting of four concrete tiles containing 0.8% pentachlorophenol cement, four concrete tiles containing 1.0% pentachlorophenol cement, and four tiles containing regular Portland cement. Each tile in the platform was swabbed, and bacterial counts made, four times each week, for a period of five months. The total number of days on which tests were made exceeded sixty. The average of all the individual tests showed a ratio of bacteria on the respective types of tile to be:

1.0% pentachlorophenol tile ---------------- 1
0.8% pentachlorophenol tile ---------------- 1.4
Untreated Portland cement ---------------- 3.0

In other words, 1.0% pentachlorophenol cement gave a bacterial reduction of 66% as compared to untreated cement.

The complementary action of the inorganic and organic disinfectants was strikingly shown in a series of tests conducted on tiles made from hydraulic cements. Three tiles were made from untreated hydraulic cement, three others were made from a hydraulic cement incorporating 2% of pentachlorophenol, and still three others were made from a hydraulic cement incorporating 1% of pentachlorophenol and 1% of cupric oxide. The tiles were washed for twenty-five days by changing the water twice daily. Each of the tiles was then inoculated with 1 cc. of whole milk. Thereafter, the three untreated tiles and those tiles incorporating the pentachlorophenol were swabbed in accordance with procedures previously explained and bacteria counts taken. During the last two days of the testing period the three tiles containing the admixture of the pentachlorophenol and cupric oxide were swabbed and the bacteria count taken. By operating in accordance with established statistical procedure, the average bacteria count was found to be 1,759,000 on the untreated tile, 579,000 on the tile containing the pentachlorophenol alone, and 4,680 on the tile containing an admixture of pentachlorophenol and cupric oxide. In a similar series of tests, tile made from cement containing 1% of pentachlorophenol and 1% of metallic copper showed an average bacteria count of 218,000.

The halogenated phenols may be incorporated with hydraulic cement in combination with a material, such as an inorganic salt of a high molecular weight fatty acid, to increase the life of the disinfectant action. For instance, Portland cement containing 4 parts of pentachlorophenol and 1 part of a soluble metallic salt of stearic acid, such as a sodium or potassium salt, to 1000 parts of cement, showed a bacteria-free zone in the agar-plate test, using *Staphylococcus aureus*, of six millimeters after 44 days of water washing. Portland cement containing 0.4% pentachlorophenol alone, after only 13 days of water washing, showed a bacteria-free zone of five millimeters in the same test. This shows that the incorporation of an inorganic salt of a high molecular weight fatty acid in Portland cement with a halogenated phenol increases the life of the disinfectant action.

The stabilizing and complementary action of soaps on polyhalogenated phenols when they are incorporated in concrete was verified further by a series of tests conducted simultaneously with those previously described comparing the relative potency of hydraulic cements containing pentachlorophenol with hydraulic cements containing a mixture of pentachlorophenol and copper compounds. As stated before, the statistical average of the bacteria count on the concrete tiles free of added disinfectants was 1,759,000. The statistical average of the bacteria count on the concrete tiles containing 0.4% pentachlorophenol, as compared to the amount of cement, was found to be 1,057,000, while concrete tiles containing 0.4% of pentachlorophenol and 0.1% of a commercial soap, consisting primarily of a sodium salt of a higher fatty acid, gave a bacteria count of 90,000. These tests show that the effectiveness of the permanent disinfectant action of concrete containing polyhalogenated phenols is increased greatly by the incorporation of minor percentages of inorganic salts of higher molecular fatty acids.

It should be understood that the foregoing description comprises preferred embodiments of the invention and is included to illustrate the practice of the invention. Many variations and modifications may be made in the illustrative embodiments without departing from the spirit of the invention or its scope which is defined in the appended claims.

We claim:

1. The method of making a disinfecting cement forming strong structural materials, such as concrete, stucco, plaster and the like, which comprises mixing a disinfectant agent composed of a polyhalogenated phenol and a copper compound with the cement clinkers prior to their grinding, using said disinfectant agent as a grinding aid, and leaving said agent in the cement to act jointly as a plasticizer in the final cement.

2. A self-disinfecting concrete forming strong structural materials comprising a Portland cement, aggregate, pentachlorophenol and a copper compound.

CHARLES RHODIMER AMBERG.
WILLIAM JOHN KNAPP.

REFERENCES CITED

The following references are of record in the file of this patent:

UNITED STATES PATENTS

| Number | Name | Date |
|---|---|---|
| 2,296,401 | Perkins | Sept. 22, 1942 |
| 2,267,101 | Heuter | Dec. 23, 1941 |
| 1,972,961 | Tisdale et al. | Sept. 11, 1934 |
| 1,421,914 | Coleman | July 4, 1922 |
| 446,285 | Fottrell | Feb. 10, 1891 |

FOREIGN PATENTS

| Number | Country | Date |
|---|---|---|
| 513,366 | Great Britain | Oct. 11, 1939 |
| 8,504 | Great Britain | 1904 |
| 11,209 | Great Britain | 1891 |

OTHER REFERENCES

Industrial & Engineering Chemistry, Nov. 1939, pp. 1431–1435.